United States Patent
Lalgudi et al.

(10) Patent No.: US 10,570,307 B2
(45) Date of Patent: Feb. 25, 2020

(54) SELF-HEALING POLYMERIC COMPOSITION

(71) Applicant: Battelle Memorial Institute, Columbus, OH (US)

(72) Inventors: Ramanathan S. Lalgudi, Westerville, OH (US); Beth Muszynski Britt, Columbus, OH (US)

(73) Assignee: Battelle Memorial Institute, Columbus, OH (US)

(*) Notice: Subject to any disclaimer, the term of this patent is extended or adjusted under 35 U.S.C. 154(b) by 6 days.

(21) Appl. No.: 15/036,941

(22) PCT Filed: Nov. 18, 2014

(86) PCT No.: PCT/US2014/066119
§ 371 (c)(1),
(2) Date: May 16, 2016

(87) PCT Pub. No.: WO2015/074039
PCT Pub. Date: May 21, 2015

(65) Prior Publication Data
US 2016/0289484 A1    Oct. 6, 2016

Related U.S. Application Data

(60) Provisional application No. 61/905,538, filed on Nov. 18, 2013, provisional application No. 61/987,119, filed on May 1, 2014.

(51) Int. Cl.
C09D 5/08 (2006.01)
C09D 175/02 (2006.01)
(Continued)

(52) U.S. Cl.
CPC .............. *C09D 133/06* (2013.01); *C09D 5/08* (2013.01); *C09D 161/06* (2013.01);
(Continued)

(58) Field of Classification Search
None
See application file for complete search history.

(56) References Cited

U.S. PATENT DOCUMENTS 6,518,330 B2 † 2/2003 White
7,108,914 B2    9/2006 Skipor et al.
(Continued)

FOREIGN PATENT DOCUMENTS

EP    2208611 A1    7/2010
WO    02064653 A2   8/2002
(Continued)

OTHER PUBLICATIONS

Kumar, A and Stephenson, L. D., "Self Healing Coatings", Corrosion 2002, Proceedings, National Association of Corrosion Engineers Conference, Denver, Colo., Apr. 7-11, 2002. (Year: 2002).*
(Continued)

*Primary Examiner* — Richard A Huhn
(74) *Attorney, Agent, or Firm* — Greer, Burns & Crain Ltd.

(57) ABSTRACT

A self-healing polymeric composition includes a polymer matrix and a plurality of functional microcapsules dispersed in the polymer matrix. The functional microcapsules include a core of a flowable material that can form film via coalescence, physical crosslinking and/or polymerization on contact with the substrate, and a polymer shell encapsulating the core. The functionality on the polymer shell is effective in complexing with the corrosion by-products, releasing the core material to repair the failure.

19 Claims, 6 Drawing Sheets

(51) Int. Cl.
*C09D 161/06* (2006.01)
*C09D 161/24* (2006.01)
*C09D 161/28* (2006.01)
*C09D 163/00* (2006.01)
*C09D 133/06* (2006.01)

(52) U.S. Cl.
CPC ......... *C09D 161/24* (2013.01); *C09D 161/28* (2013.01); *C09D 163/00* (2013.01); *C09D 175/02* (2013.01)

(56) References Cited

U.S. PATENT DOCUMENTS

| | | |
|---|---|---|
| 7,723,405 B2 | 5/2010 | Braun et al. |
| 8,623,653 B2 | 1/2014 | Lalgudi et al. |
| 2009/0036568 A1 | 2/2009 | Merle et al. |
| 2009/0181254 A1 † | 7/2009 | White |
| 2012/0207921 A1 * | 8/2012 | Calle ................ B01J 13/14 427/140 |
| 2013/0017405 A1 | 1/2013 | Benkoski et al. |
| 2013/0196071 A1 | 8/2013 | Yang et al. |
| 2015/0111987 A1 * | 4/2015 | Wilson ................ B29C 73/22 523/209 |
| 2015/0158003 A1 | 6/2015 | Virgallito et al. |

FOREIGN PATENT DOCUMENTS

| | | |
|---|---|---|
| WO | 2004007608 A2 | 1/2004 |
| WO | 2009126802 A1 | 10/2009 |
| WO | 2013009873 A2 | 1/2013 |
| WO | 2015085141 A1 | 6/2015 |

OTHER PUBLICATIONS

International Preliminary Report On Patentability and Written Opinion, Application No. PCT/US2014/066119, dated Jun. 2, 2016.

\* cited by examiner
† cited by third party

SELF-HEALING POLYMERIC COMPOSITION

CROSS-REFERENCE TO RELATED APPLICATIONS

This application claims the benefit of U.S. Provisional Application No. 61/905,538, filed Nov. 18, 2013, and U.S. Provisional Application No. 61/987,119, filed May 1, 2014, the disclosures of which are incorporated herein by reference.

BACKGROUND OF THE INVENTION

Polymeric materials are used in a wide variety of applications, for example, in the production of different plastic objects or in coatings for surfaces. A recurring issue with polymeric materials is that they tend to fail or degrade due to mechanical fatigue, mechanical impact, oxidative aging, thermal fatigue, chemical degradation, or a combination of these processes. The degradation can lead to embrittlement of the polymer and associated cracking. Mechanical fatigue and mechanical stress can also lead to cracks in the polymeric material. When cracks occur in a polymeric coating on a metal surface, the underlying metal surface can be exposed to the elements and be subject to corrosion.

Recently there have been developed "self-healing" polymeric materials that can repair cracks or other damage in the materials after they occur. There is widespread interest to use such materials in the coating industry for corrosion mitigation and in other applications. Generally the self-healing polymeric materials are comprised of a polymer matrix and two separate kinds of microcapsules dispersed in the matrix. The first microcapsules include a core containing a reactive oligomer and the second microcapsules include a core containing a catalyst. The first microcapsule releases the reactive oligomer upon stress and the oligomer flows into the crack and polymerizes upon contact with the catalyst released from the second microcapsule Implementation of this two-part catalyzed cure microencapsulation technology for self-healing coating development has been challenging due to the complex curing mechanism of the coatings and other issues. There is still a need for improvements in self-healing polymeric compositions.

SUMMARY OF THE INVENTION

A self-healing polymeric composition includes a polymer matrix and a plurality of functional microcapsules dispersed in the polymer matrix. The functional microcapsules include a core of a flowable material that can form film via coalescence, physical crosslinking and/or polymerization on contact with the substrate, and a polymer shell encapsulating the core. The functionality on the polymer shell is effective in complexing with the corrosion by-products, releasing the core material to repair the failure.

DETAILED DESCRIPTION OF THE PREFERRED EMBODIMENT

The "flowable polymerizable material" is also referred to herein as the "healing agent" or the "self-healing agent". By "contact with the substrate" is meant the oligomer will polymerize on contact with the substrate that are capable of generating reducing agents such as iron (II) or Al (III) ions under stressed or corrosive environment. By "failure" is meant a crack in the polymer matrix, a loss of cohesion within the polymer matrix, or another defect that can be repaired by the flow of the polymerizable material to the defect.

In another embodiment, the invention relates to a self-healing polymeric composition comprising a polymer matrix and a plurality of microcapsules dispersed in the polymer matrix. The microcapsules include a core of a flowable polymerizable material, a polymer shell encapsulating the core, and a corrosion sensing functional group attached to the polymer shell. The polymer shell is effective for rupturing with a failure of the polymer matrix to allow flow of the polymerizable material to repair the failure.

In a further embodiment, the invention relates to a self-healing polymeric composition comprising a polymer matrix and a plurality of microcapsules dispersed in the polymer matrix. The microcapsules include a core of a flowable polymerizable material, a polymer shell encapsulating the core, and a complexing agent attached to the polymer shell. The polymer shell is effective for rupturing with a failure of the polymer matrix to allow flow of the polymerizable material to repair the failure. The complexing agent is effective to form a complex with a corrosion byproduct, the complexation creating a stress on the polymer shell that promotes the rupturing.

In yet another embodiment, the invention relates to a self-healing polymeric composition comprising a polymer matrix, unencapsulated activator or catalyst and a plurality of microcapsules dispersed in the polymer matrix. The polymer shell is effective for rupturing upon corrosion to allow the flow of the polymerizable material. The unencapsulated activator activates the polymerization to repair the failure. Any suitable activator can be used, for example, ceric ammonium nitrate, cerium (IV) oxide and the like.

In a particular aspect, we disclose the formation of functional microcapsules capable of sensing corrosion byproducts and releasing healing agent to the corrosion induced cracks. The functional microcapsules comprise a healing agent in the core of the microcapsule and a polymer shell with a corrosion sensing functional group.

The healing agent used in the core of the self-healing polymeric composition can be any flowable polymerizable material. In certain embodiments, the polymerizable material can polymerize without an activator (catalyst or initiator). For example, in certain embodiments, the polymerizable material is a thermoplastic material, such as thermoplastic oligomers, monomers or prepolymers. More particularly, in certain embodiments the thermoplastic oligomers are exemplified but not limited to acrylic oligomers with or without hydroxyl, amino, carboxyl functional groups.

Figure 1:
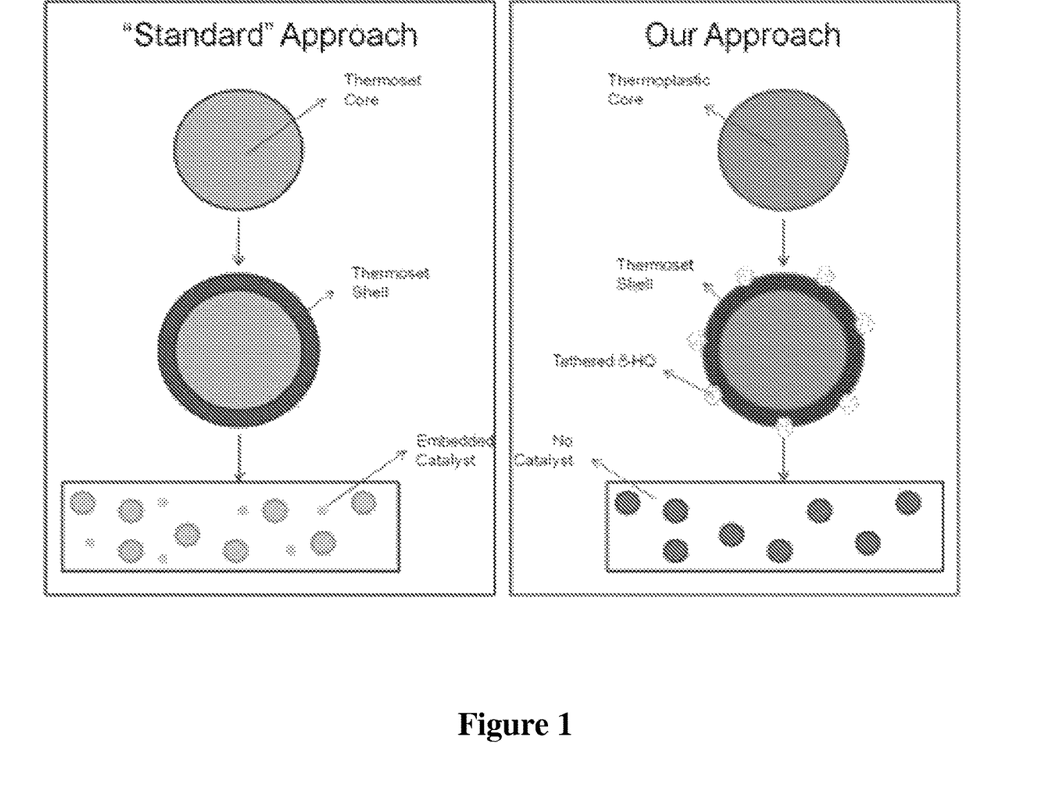
FIG. 1 is a schematic illustration contrasting a self-healing polymeric composition according to the invention versus a previously known self-healing polymeric composition.

The approach of using thermoplastic core materials instead of thermoset core materials offers the advantage in that a catalytic curing agent is not required to harden the material. The difference between our approach and previous microencapsulation approaches is shown in FIG. 1. The self-healing polymeric composition of the invention utilizes a thermoplastic healing material that does not require an external catalyst for activation. By eliminating the catalytic second component, the challenges associated with primer cure and the need to use a second set of capsules can be eliminated.

The thermoplastic core should have adequate flow and optimal cure rate upon fracture in order to be an effective self-healing agent.

The polymer shell is exemplified by but not limited to formaldehyde condensation products of urea, phenol and malemine, polyurethane, polyurea, epoxy, acrylics, or other condensation polymers. Alternative, it could be an inorganic shell such as a polymer based on silica or zirconia. A large number of other types of polymers are possible for use in the shell.

The corrosion sensing functional group is linked to the polymer shell that are exemplified by but not limited to hydroxyl quinolines, morpholine, imidazole, oxazole and thazoles. Additional examples are disclosed in U.S. patent application publication no. 2011/0053275 A1, "Corrosion Detection Product and Method", by Lalgudi et al., published Mar. 3, 2011, which is incorporated by reference herein.

In a particular example, the acrylic oligomers are synthesized by free radical addition polymerization and dissolved them in suitable co-solvents to form the respective self-healing core material. The self-healing material is encapsulated in 8-hydroxyquinoline functionalized polymer shell via suspension polycondensation method. The microcapsules obtained were added to mil-spec coatings and evaluated their performance for self-healing and corrosion protection. The coatings are spray applied on test coupons and after curing, the panels are impacted at 16, 24, 40, and 60 in-lbs. The resulting cracks are examined using fluorescence microscopy. It was found that the viscosity and overall stability of the oligomer in the microcapsules dictates the self-healing performance. We have observed that that the low viscosity as well as the overall stability of the self-healing material enables the capsule core to fill the microcracks more effectively. As a result of self-healing, the corrosion performance of the microcapsule filled coatings has been improved and it is evident from the results observed in the SAE J2334 cyclic corrosion test.

In certain embodiments, self-healing coatings have been formulated based on oligomer filled microcapsules and reported below are the details of structure-activity relationship of microcapsules with respect to the self-healing properties and the corrosion performance.

In certain embodiments, the microcapsules of the invention are composed of three parts, which can be seen in FIG. 1.

1. A self-healing thermoplastic core material to allow flow into corrosion-induced cracks.

2. A polymer shell material, which is cross-linked to provide the brittleness to rupture upon intersection with a propagating crack.

3. A corrosion sensing functional group attached to the shell of the microcapsule to provide an optical indication upon contact with corrosion by-products.

The resulting microcapsules can be formulated directly into any coatings to provide the desired corrosion detection and mitigation properties.

In certain embodiments, the microcapsules can be embodied as self-healing smart beads that detect and repair corrosion. For example, the bead may not only detect corrosion but deliver a payload to help heal the microscopic cracks that rust creates.

The smart beads may have any suitable size. For example, they may be tiny beads having a major diameter of 20 to 50 microns. In certain embodiments, the beads may appear to be a fine powder. The powder may be whitish in color or another suitable color.

In certain embodiments, the smart beads are in the form of a powder and can be mixed with coatings that can be used to coat different types of surfaces that are subject to corrosion. For example, the beads can be mixed with coatings that could be used to paint pipelines. The self-healing smart beads can reveal where corrosion is forming on metal even though one can't see degradation with the naked eye. Once detected, the beads can then release a chemical that fills the cracks.

In certain embodiments, the beads fluoresce in the presence of corrosion and can be seen with a special light. This can give technicians the information that corrosion is happening (even if it isn't showing through the paint), and give them time to figure out how to mitigate the problem, because the beads repair and stem the onset of the corrosion.

This technology can be valuable for many industries, for example, the oil and gas industry. For instance, in the oil and gas industry, a technician may run a routine scan of the outer shell of a pipeline with a handheld device and find a spot of corrosion. Then the technician would know that a chemical was fast at work fighting the corrosion and can report that a problem needs to be addressed at that section of the pipeline. The time and money savings could be immense.

In certain embodiments, a smart coating can be derived from a functional nanomaterial that can be applied between a primer and a topcoat.

In certain embodiments, the beads or nanocapsules of the present invention are combined in a paintable product offering with another technology for detection of fluorescent materials in the flowable core using Terahertz or UV radiation. For example, this may include the technology described in U.S. Pat. No. 8,623,653 B2 to Lalgudi et al, issued Jan. 7, 2014, which is incorporated by reference herein.

The present invention is exemplified in the following sections:

1. Experimental

Three self-healing core materials were chosen for this study. They are (a) commercially available acrylic copolymer (Paraloid A-21), (b) poly(aceto-acetoxyethly methacrylate) (p-AAEM) made via free radical polymerization and (c) poly(stearyl methacrylate) (PSMA-TG) diol made via free radical polymerization of stearyl methacrylate in the presence of thio glycerol as chain transfer agent. These polymers were the dissolved in selective solvents to form the self-healing capsule core and their respective description used herein are: (a) 10% Paraloid A-21 in propylene carbonate, (b) 30% p-AAEM in propylene carbonate and (c)

50% PSMA-TG in lauryl methacrylate (LMA). The self-healing materials were encapsulated via polycondensation polymerization process using melamine, formaldehyde and 8-hydroxyquinoline.

2. Characterization

The particle size was analyzed by Malvern APA 2000. 1 micron polystyrene latex in water was used for standardization. Fluorescent imaging was performed using Zeiss microscope fitted with Axio Imager A1.

3. Results and Discussion 3.1 Synthesis of Self-Healing Materials

To best mitigate the effects of corrosion via an encapsulated healing agent, in certain embodiments the microcapsule core and shell materials are identified for use based on one or more of the following factors:

The shell material (a) is insoluble in the capsule core material as well as the epoxy primer resin, (b) is inert in the applied epoxy primer resin and the core material, (c) is resilient when exposed to an applied pressure, (d) fractures upon an applied shear force. The core material (a) is compatible with the epoxy primer resin, (b) flows via capillary action, (c) forms a film resistant to corrosive materials, (d) is stable after encapsulated.

The following three self-healing candidate materials were selected for this study:

(a) commercially available acrylic copolymer (Paraloid A-21), (b) poly(aceto-acetoxyethly methacrylate) (p-AAEM) made via free radical polymerization and (c) poly(stearyl methacrylate) (PSMA-TG) diol made via free radical polymerization of stearyl methacrylate in the presence of thio glycerol as chain transfer agent. These polymers were then dissolved in selective solvents to form the self-healing capsule core and their respective description used in this paper are: (a) 10% Paraloid A-21 in propylene carbonate, (b) 30% p-AAEM in propylene carbonate and (c) 50% PSMA-TG in lauryl methacrylate (LMA).

3.2 Encapsulation of Self-Healing Agents

The ratio of core to shell was 0.8 (i.e. 100 grams of microcapsules contains 80 grams of active healing agent). It was found that candidate (c) PSMA-TG diluted with LMA resulted in preferred microcapsules. The observations during the encapsulation process are given in Table 1. The encapsulation efficiency is dependent on the stability of the active ingredient (self-healing material) micro droplets in the continuous phase (water). Therefore, a factor in encapsulation is the stability of the active ingredient in the continuous phase. In our present study the less preferred capsule formation has been observed when using propylene carbonate solvent. PC is soluble in water around 17% (ref) and its solubility parameter (δ) is 27.2 MPa$^{1/2}$ (Ref). We believe either high miscibility of PC with water (this would result in extracting the self-healing agent to the continuous water phase) or the close match of δ values with melamine (this would lead to inadequate shell formation) may be a factor in incomplete encapsulation or poor encapsulation efficiency.

TABLE 1

Summary of observations during the encapsulation process

| Sample | Result of mixing with water: | Result of Encapsulation: |
| --- | --- | --- |
| Paraloid A-21 in PC | Cloudy interface | Incomplete encapsulation with free core and shell material present. |

TABLE 1-continued

Summary of observations during the encapsulation process

| Sample | Result of mixing with water: | Result of Encapsulation: |
| --- | --- | --- |
| p-AAEM in PC | Clean interface | Possible core material polymerization |
| PSMA-TG in LMA | Cloudy interface | Successful encapsulation |

3.3 Characterization of Self-Healing Material

The three bulk oligomer samples discussed in the previous section were evaluated on the basis of dry time. For this purpose, low carbon steel panels were cleaned and, using a doctor blade. the samples were applied at 3 mils wet film to the surface of the steel panel. Additionally, a Paraloid/toluene sample was prepared for comparison purposes. The panels were allowed to dry at ambient conditions and then were observed for changes in coating condition. The results of this initial investigation are presented in Table 2. The dry time of each of the three candidate materials exceeds 24 hours, whereas the dry time of the Parloid/Toluene material does not. This indicates that solvents with lower boiling points are less preferred as a carrier solvent for the self-healing agent. Low boiling solvents in the formulation may adversely affect the flowability of the healing agent and shelf-life of the microcapsules.

TABLE 2

Results of an investigation into the dry time required for Generation 1 and Generation 2 multifunctional microcapsules.

| Sample | Dry Time | Notes |
| --- | --- | --- |
| Paraloid A-21 in Toluene | 24 hours | Continuous hard film |
| Paraloid A-21 in PC | 7 days | Continuous tacky film |
| p-AAEM in PC | >7 days | Continuous wet film, no fish eyes |
| PSMA-TG in LMA | >7 days | Continuous wet film, no fish eyes |

Additionally, each of the candidate materials demonstrated favorable interaction with the steel substrate, as evidenced by forming a continuous film on the steel substrate. This will allow it to bond to the steel and prevent further corrosion damage from occurring in the field.

Figure 2:
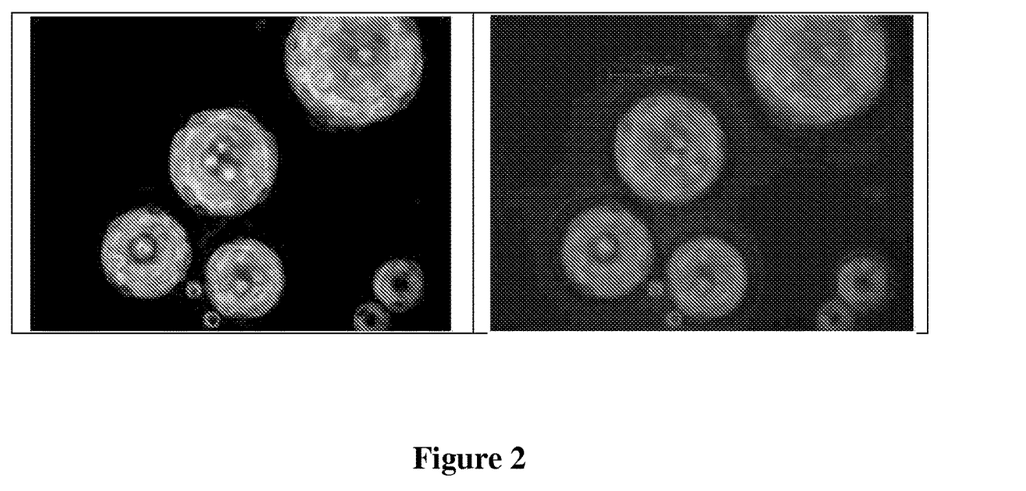
FIG. 2 shows optical micrographs of some microcapsules that may be used in the invention.
Figure 3:
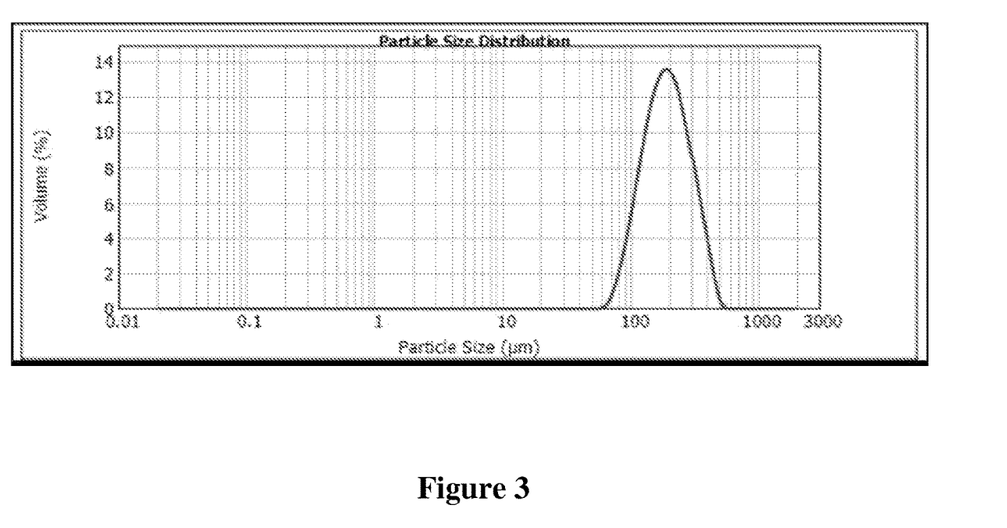
FIG. 3 is a graph showing particle size distribution of some examples of microcapsules that may be used in the invention.

3.4 Characterization of Microcapsules with Self-Healing Core Material 3.4.1 Particle Size and Distribution The PSMA-TG/LMA microcapsule was analyzed by optical microscopy (FIG. 2) and capsules were=to be spherical in shape. FIG. 2 shows the optical micrographs of acid-washed capsules imaged during illumination by (a) a visible light source and (b) a UV source. (Note: The relative transparence of the center of the microcapsules, relative to the edges, demonstrates that the HQ is preferentially tethered to the outer core of the microcapsules.) The particle size distribution was analyzed by light scattering (FIG. 3) and the particle size distribution was found to be broad. FIG. 3 shows the particle size distribution of PSMA-TG/LMA.

3.4.2 Accelerated Aging

The stability of the self-healing core material was studied to ensure that no stability issues would be encountered with the material. The microcapsules were stored at an elevated temperature of 150° F. (65° C.). The weight loss of the capsule samples was monitored over the course of 10 days. After six days, the sample weights stabilized with 91% of the core material remaining intact. These results suggest that the self-healing material present in the microcapsule core has not been lost and remained functional inside the capsules.

3.4.3 Evaluation of Self-Healing Properties

Figure 4:
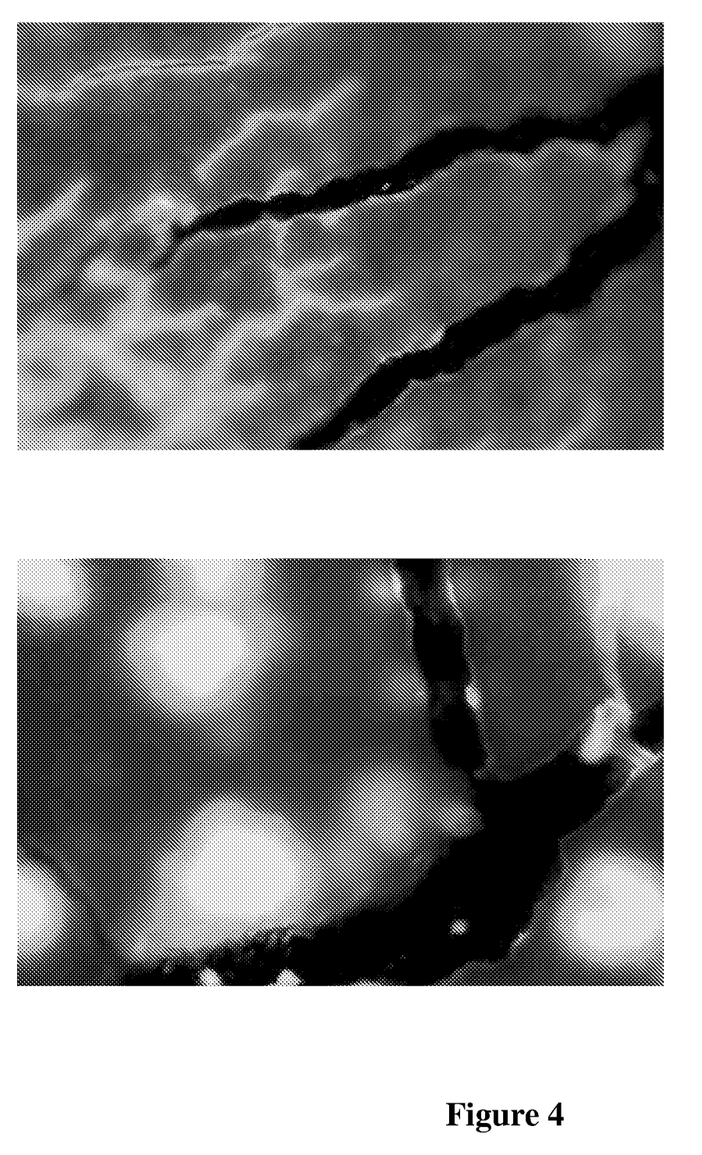
FIG. 4 shows fluorescent microscopic images of damaged coatings indicating the flow of healing agents into the cracks.

To track the ability of the healing agent to fill defects in films, an inert fluorescent dye was added into the core material prior to encapsulation. Self-healing of the microcapsule loaded coatings was tested using the reverse impact test method. Cured panels were impacted at 16, 24, 40, and 60 in-lbs, and the resulting cracks were examined using fluorescence microscopy. High contrast images were obtained to show the presence or absence of healing agent at a given time and location. FIG. 4 demonstrates that the reactive oligomer filled microcapsules enables to fill the microcracks more effectively than the microcapsules filled with high molecular weight polymer. This is due to the low viscosity as well as the overall stability of the self-healing material present in the capsule core of the microcapsules. In FIG. 4, the microscopic image of damaged coatings indicates the flow of healing agents into the cracks. In the top image, the healing agent is reactive oligomer. In the bottom image, the healing agent is aged high molecular weight polyacrylates dissolved in toluene.

3.5 Evaluation of Coating Performance

Figure 5:
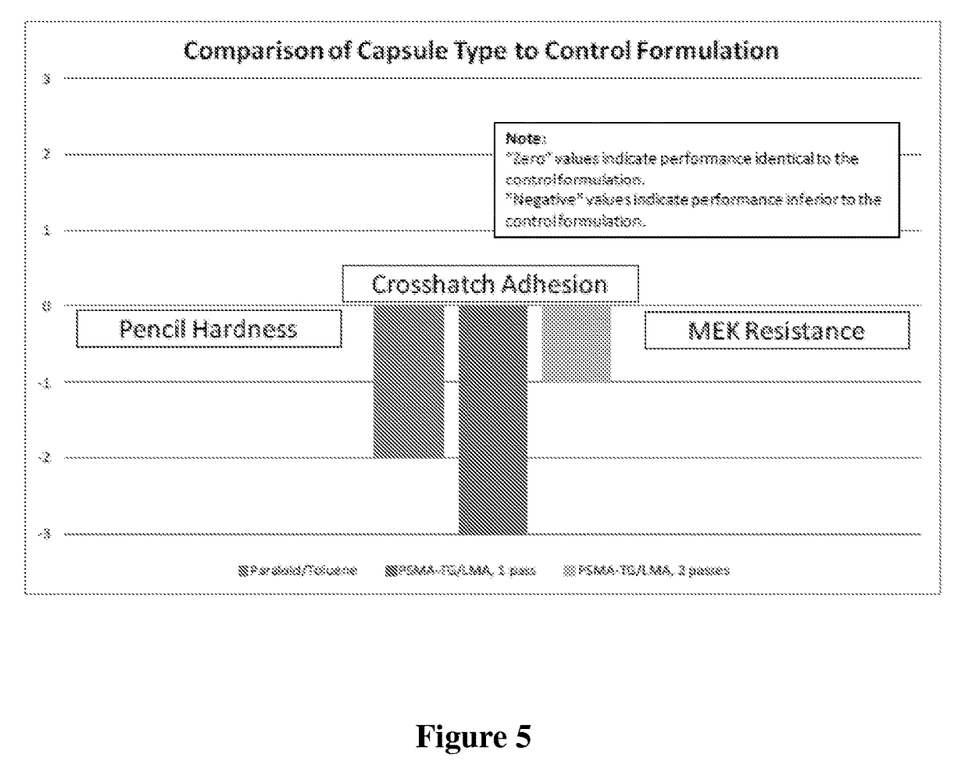
FIG. 5 is a graph showing the results of physical properties testing of a polymeric coating containing microcapsulses according to the invention versus a polymeric coating without microcapsules.

Steel coupons were coated with the total coating stack-up and evaluated based on hardness, adhesion, impact resistance, and MEK resistance. The results of the coatings testing are shown in FIG. 5. This figure shows the results of physical properties testing performed to compare second generation capsule loaded primer coatings with primer coatings containing no microcapsule components.

The results in FIG. 5 are presented such that the microcapsule loaded primer is monitored relative to the performance of the unloaded primer coatings. Positive values indicate that the performance of the microcapsule loaded films performed more favorably than the films containing no microcapsules. Negative values indicate that the microcapsule films performed less favorably than the films containing microcapsules. The above figures demonstrate the general effect of adding liquid-filled microcapsules to the primer system. Marginally improved impact resistance and unchanged MEK resistance were observed where tested. Changes in pencil hardness were not observed for the coatings containing oligomer filled microcapsules. The crosshatch adhesion for the oligomer filled capsules is slightly lower compared to control coatings (no capsules). We believe this could be due to the presence of small amount of healing agent present on the wall of the capsules that could have affected the interfacial adhesion between the epoxy primer layer and polyurethane top layer.

3.6 SAE J2334 Test Results

Figure 6:
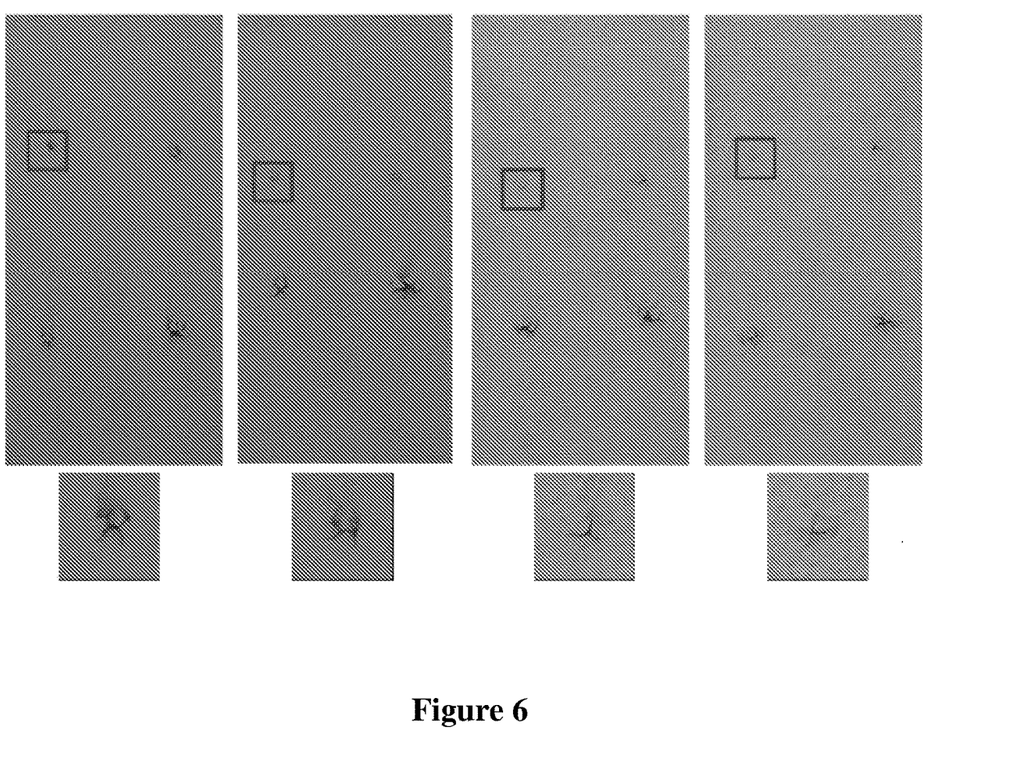
FIG. 6 shows photographs of panels exposed to testing that are coated with a control polymeric coating versus several embodiments of polymeric coatings according to the invention.

All samples were prepared and tested in triplicate and the panels were subjected to reverse impact stresses followed by subsequent testing in accordance with SAE J2334 for seven days. Samples were monitored once per day, for a total of seven days. The results of this test are shown in FIG. 6. This figure shows a comparison of panels exposed to testing in accordance with SAE J2334 for 7 days. The descriptions in (a)-(d) describe the panels from left to right: (a) CARC stack-up control, no sapsules; (b) CARC stack-up containing Paraloid/toluene (Generation 1) capsules; (c) CARC stack-up containing PSMA-TG (Generation 2) capsules, one coat; (d) CARC stack-up containing PSMA-TG capsules (Generation 2), two coats.

The images contained in FIG. 6 show a marked improvement in the degree of corrosion that is observed in the coatings containing two coats of the microcapsules, relative to the control panels containing no microcapsules and the panels containing polyacrylate/tolune as self healing core in the microcapsules. The highlighted area in FIG. 6, showing the behavior of the 16 in-lb impact sites, is magnified to highlight the difference between the different samples. Little corrosion is observed after 7 days at the 16 in-lb and 24 in-lb impact sites in the coating containing oligomer filled microcapsules, however, the samples containing no microcapsules and polyacrylate/tolune microcapsules show definitive corrosion at those same impact sites. These results indicate that the oligomer filled microcapsules represent a significant improvement relative to the polyacrylate/toluene filled microcapsules. The performance of the microcapsule filled coatings has been improved and it is evident from the results observed in the SAE J2334 cyclic corrosion test.

The principle and mode of operation of this invention have been explained and illustrated in its preferred embodiment. However, it must be understood that this invention may be practiced otherwise than as specifically explained and illustrated without departing from its spirit or scope.

The invention claimed is:

1. A self-healing polymeric composition comprising:
    a polymer matrix and a plurality of microcapsules dispersed in the polymer matrix;
    the microcapsules including a core of a flowable polymerizable material that can polymerize on contact with a substrate that is capable of generating iron (II) or Al (III) ions under stressed or corrosive environment, and a polymer shell encapsulating the core;
    wherein a complexation agent is attached to the polymer shell and the complexation agent forms a complex with a corrosion byproduct creating stress on the polymer shell to rupture the polymer shell, or wherein a corrosion sensing functional group is attached to the polymer shell and the polymer shell ruptures on sensing corrosion byproducts.

2. The self-healing polymeric composition of claim 1 wherein a corrosion sensing functional group is attached to the polymer shell.

3. The self-healing polymeric composition of claim 2 wherein the corrosion sensing functional group is effective to provide a visual, optical or spectral indication upon contact with a corrosion by-product.

4. The self-healing polymeric composition of claim 1 wherein a complexing agent is attached to the polymer shell.

5. The self-healing polymeric composition of claim 4 wherein the complexing agent is effective to form a complex with a corrosion byproduct, the complexation creating a stress on the polymer shell that promotes the rupturing.

6. The self-healing polymeric composition of claim 4 wherein the complexing agent is selected from the group consisting of quinolines, morpholines, imidazoles, oxazoles and thiazoles.

7. The self-healing polymeric composition of claim 1 wherein the polymer shell is cross-linked to increase its brittleness and susceptibility to rupture.

8. The self-healing polymeric composition of claim 1 wherein the polymer matrix comprises a paint and an unencapsulated activator or catalyst.

9. The self-healing polymeric composition of claim 1 wherein the flowable polymerizable material has a viscosity below or equal to 500 cps.

10. The self-healing polymeric composition of claim 1 wherein the polymerizable material is thermoplastic.

11. The self-healing polymeric composition of claim 10 wherein the polymerizable material comprises thermoplastic oligomers.

12. The self-healing polymeric composition of claim 11 wherein the thermoplastic oligomers have solubility parameter below or equal to 25 $\text{Mpa}^{1/2}$, number average molecular weight between 250 and 7000, and viscosity below or equal to 500 cps.

13. The self-healing polymeric composition of claim 11 wherein the thermoplastic oligomers have one or more hydroxyl, amine, carboxyl, vinyl and acrylic functionality.

14. The self-healing polymer composition of claim 11 wherein the polymerizable material further comprises a peroxygen compound.

15. The self-healing polymeric composition of claim 14 wherein the peroxygen compound is present in the amount between 0.1-1.0 wt % and the peroxygen compound is ammonium peroxydisulfate, potassium peroxydisulfate, or peroxy diphosphate.

16. A self-healing polymeric composition comprising:
a polymer matrix and a plurality of microcapsules dispersed in the polymer matrix;
the microcapsules including a core of a flowable polymerizable material that can polymerize on contact with a substrate that is capable of generating reducing agents under stressed or corrosive environment, and a polymer shell encapsulating the core, wherein the polymerizable material comprises thermoplastic oligomers having a solubility parameter below or equal to 25 $Mpa^{1/2}$, number average molecular weight between 250 and 7000, and viscosity below or equal to 500 cps;
the polymer shell effective for rupturing with a failure of the polymer matrix to allow flow of the polymerizable material to repair the failure.

17. The self-healing polymeric composition of claim 16 wherein a corrosion sensing functional group is attached to the polymer shell or wherein a complexing agent is attached to the polymer shell.

18. The self-healing polymeric composition of claim 16 wherein the thermoplastic oligomers have one or more hydroxyl, amine, carboxyl, vinyl and acrylic functionality.

19. The self-healing polymer composition of claim 16 wherein the polymerizable material further comprises a peroxygen compound selected from ammonium peroxydisulfate, potassium peroxydisulfate, and peroxy diphosphate.

* * * * *